United States Patent [19]
Farmer

[11] Patent Number: 4,636,852
[45] Date of Patent: Jan. 13, 1987

[54] SCRAMBLING AND DESCRAMBLING OF TELEVISION SIGNALS FOR SUBSCRIPTION TV

[75] Inventor: James O. Farmer, Doraville, Ga.

[73] Assignee: Scientific-Atlanta, Inc., Atlanta, Ga.

[21] Appl. No.: 574,211

[22] Filed: Jan. 26, 1984

[51] Int. Cl.$^4$ ............................................. H04N 7/167
[52] U.S. Cl. .................................... 358/120; 358/118; 358/150
[58] Field of Search ............... 358/114, 118, 120, 122, 358/150

[56] References Cited

U.S. PATENT DOCUMENTS

| | | |
|---|---|---|
| 2,847,501 | 8/1958 | Ellett . |
| 2,910,526 | 10/1959 | Druz . |
| 2,916,543 | 12/1959 | Druz . |
| 2,972,008 | 2/1961 | Ridenour et al. . |
| 3,081,376 | 3/1963 | Louglin et al. . |
| 3,147,061 | 9/1964 | Walker, Jr. et al. . |
| 3,439,113 | 4/1969 | Walker ................................. 358/120 |
| 3,729,576 | 4/1973 | Court ................................... 358/120 |
| 4,091,417 | 5/1978 | Nieson ................................. 358/117 |
| 4,222,068 | 9/1980 | Thompson ........................... 358/120 |
| 4,319,273 | 3/1982 | Nossem ............................... 358/120 |
| 4,353,088 | 10/1982 | den Toonder et al. ............. 358/120 |
| 4,396,947 | 8/1983 | Cheung ................................ 358/120 |
| 4,398,215 | 8/1983 | Osaka .................................. 358/120 |
| 4,454,544 | 6/1984 | Abbott ................................. 358/120 |
| 4,489,347 | 12/1984 | Tentler ................................. 358/118 |
| 4,527,195 | 7/1985 | Cheung ................................ 358/120 |
| 4,533,949 | 8/1985 | Fujimura et al. .................. 358/119 X |

Primary Examiner—S. C. Buczinski
Assistant Examiner—Linda J. Wallace
Attorney, Agent, or Firm—Martin LuKacher

[57] ABSTRACT

A scrambled TV signal is provided by adding thereto a signal having an amplitude which changes pseudorandomly in successive increments of time, the duration of each of which is much less than the horizontal line duration of the TV signal. This signal encompasses substantially the entire duration of the TV signal and has an amplitude during horizontal and substantially the entire vertical sync interval to suppress the horizontal and vertical sync pulses to picture level. The pseudorandom signal is generated synchronously with the TV signal on a frame basis and synchronizing pulses are transmitted during the vertical interval together with a pulse for amplitude calibration. A matching pseudorandom signal is generated in synchronism with the pseudorandom component of the scrambled TV signal. The synchronizing pulses and the calibration pulse operate circuits which effect synchronization and amplitude control in the generation of the matching signal. The matching signal is subtracted from the scrambled TV signal to provide a descrambled signal for reception. The incremental change in level in a random direction of the scrambled signal, either increasing or decreasing in amplitude, constitutes a random walk which is not readily duplicable by unauthorized parties in that the pattern may be different for different programs and may be changed by coding in the video portion of the TV signal or by code signals which are separately transmitted over spare channels or telephone lines or by the use of replaceable integrated circuit chips containing different codes.

24 Claims, 11 Drawing Figures

SCRAMBLING AND DESCRAMBLING OF TELEVISION SIGNALS FOR SUBSCRIPTION TV

DESCRIPTION

The present invention relates to television systems in which the TV signals are scrambled so that the pictures reproduced from the scrambled signals are so distorted as to be unintelligible when displayed, except by authorized subscribers equipped to descramble the signals.

The invention is especially suitable for use in the transmission of premium, subscription TV programs by cable systems. Features of the invention may also be applied to the transmission and reception of premium TV programs by broadcast or by other distribution networks, such as used in hotels, dormitories and other places of public accommodation.

The most widely used scheme for scrambling premium, subscription TV signals operates by suppressing the horizontal sync pulses, and in some cases the vertical sync pulses of these signals. The signals for restoring the sync pulses and descrambling the TV signal are generated by deriving timing information. Such information may be transmitted with a relatively high degree of coding efficiency by timing pulses transmitted with the audio accompanying the TV signal where the time relationship with the suppressed sync pulses is selected from a plurality of different timings or dynamically varied. Such sync suppression TV scrambling and descrambling systems are described in U.S. patent Application Ser. No. 334,040, filed Dec. 23, 1981 in the name of Robert O. Banker and assigned to the same Assignee as the present application and has been published under the Patent Cooperation Treaty (International Publication No. WO83/02378) on July 7, 1983. This application also describes various systems for sync suppression scrambling of TV signals.

It has also been proposed to provide code signals having a random variation with time. These signals are then used to distort the TV signal time-wise by varying the timing between the picture and sync intervals thereof. Such a time distortion prevents lock-up in the synchronizing circuits of the TV receiver so that the picture displayed is distorted beyond intelligibility. Various schemes for random time-wise distortion of the TV signal are discussed in the following U.S. Pat. Nos. 2,910,526, issued Oct. 27, 1959; 2,916,543, issued Dec. 8, 1959; 2,972,008, issued Feb. 14, 1961 and 3,103,550, issued Sept. 10, 1963. It has also been proposed to add a sine wave signal which is randomly swept in frequency to the TV signal and switching the sine wave on and off in sync with the TV signals sync components in order to suppress the sync components and distort the TV signal (see, U.S. Pat. No. 3,081,376 issued Mar. 12, 1963). Still other schemes which have been described (see, U.S. Pat. No. 4,070,693 issued Jan. 24, 1978) have proposed to digitize the entire TV signal and shift it randomly. In accordance with still other schemes, a random code pattern is transmitted with the TV signal, for example in the vertical interval, and must be decoded in order to authorize the descrambling of the signal, which may be transmitted with suppressed synchronizing pulses (see, U.S. Pat. Nos. 4,091,417, issued May 23, 1978 and 4,319,723, issued Mar. 9, 1982). A further modification of such schemes involving the transmission of random codes is to modulate the amplitude of the scrambling code (see, U.S. Pat. No. 4,353,088, issued Oct. 5, 1982). A still further variation on schemes involving random variations in the signal utilizes a random number generator which determines which lines of each field of the TV signals should be inverted in polarity. (See, U.S. Pat. No. 4,396,947, issued Aug. 2, 1983.)

In spite of the development of various schemes for enhancing the security of the premium programming which have been proposed from time to time over many past years, only the sync suppression scheme has achieved any substantial acceptance and commercial utilization. The need for enhanced security with minimum complexity and without unacceptable degradation of quality of the received TV picture has persisted.

It is the principal object of the present invention to provide an improved system for scrambling and descrambling of subscription TV signals which provides enhanced security without sacrificing simplicity and picture quality.

It is a further object of the invention to provide an improved system for scrambling and descrambling of subscription TV signals which is more difficult to defeat than systems using suppressed or disrupted sync and thus provides improved security over such suppressed or disrupted sync systems.

It is a still further object of the present invention to provide an improved system for scrambling and descrambling subscription TV signals which is adaptable to multiple tier subscription TV through the use of distinguishable authorizations for each tier of programming.

It is a still further object of the present invention to provide an improved system for scrmbling and descrambling of subscription TV signals wherein control signals for authorizing descrambling can be transmitted by various ways, both in or with the TV signal or independently thereof.

It is a still further object of the present invention to provide an improved scrambling and descrambling system for subscription TV wherein the scrambling and descrambling of the signal is carried out at baseband, thereby simplifying the design of the system.

It is a still further object of the present invention to provide an improved descrambling system wherein synchronizing information adapted to control the generation of descrambling or restoring signals which does not require transmission of signals which facilitate the unauthorized descrambling of the TV signal.

Briefly described, a system for descrambling of TV systems in accordance with the invention makes use of means for generating a first signal which varies in amplitude pseudorandomly and in synchronous relationship with the TV signal. The pseudorandomly varying signal and the TV signal are added to provide a pseudorandom amplitude variation substantially continuous throughout each frame of the TV signal thereby scrambling the TV signal. This signal is scrambled at baseband and modulated for transmission over a cable or by broadcast or other means together with other TV signals. Authorized receiving stations are provided with means for generating a second signal having the same pseudorandom amplitude variation and synchronous relationship with the TV signal as did the first signal. Means are provided for subtracting the second signal from the scrambled TV signal to remove the pseudorandom amplitude variation therein and enable the reception thereof by a conventional TV receiver with the minimal degradation of picture quality.

A feature of the invention for minimizing degradation of picture quality, even though the picture signal is distorted upon transmission, utilizes a pseudorandom pattern of incremental level variations which are short in time so that a multiplicity of the increments occurs during the picture portion of each line of the TV signal. The increments change in level in a random direction, either increasing or decreasing in amplitude, and constitute a random walk. Between any two time increments, the amplitude change is restricted to be the smallest change practicable. Thus, artifacts in the TV signal due to incomplete cancellation of the random walk upon descrambling have minimum visibility in the TV picture which is reproduced from the descrambled TV signal and the quality of the TV picture remains high.

Another feature for minimizing distortion is to control the rate of change (slew rate) in the transitions in level between the increments in the random walk restoring signal generated in the descrambler. The slew rate can be matched between the scrambler and descrambler, ensuring that the restoring signal will match the scrambling signal during the transition times.

An optional feature of the invention is to provide random walk scrambling patterns which are opposite in sense in successive fields of the TV signal.

The foregoing and other objects, features and advantages of the invention as well as presently preferred embodiments thereof will become more apparent from a reading of the following description in connection with the accompanying drawings in which.

Figure 2:
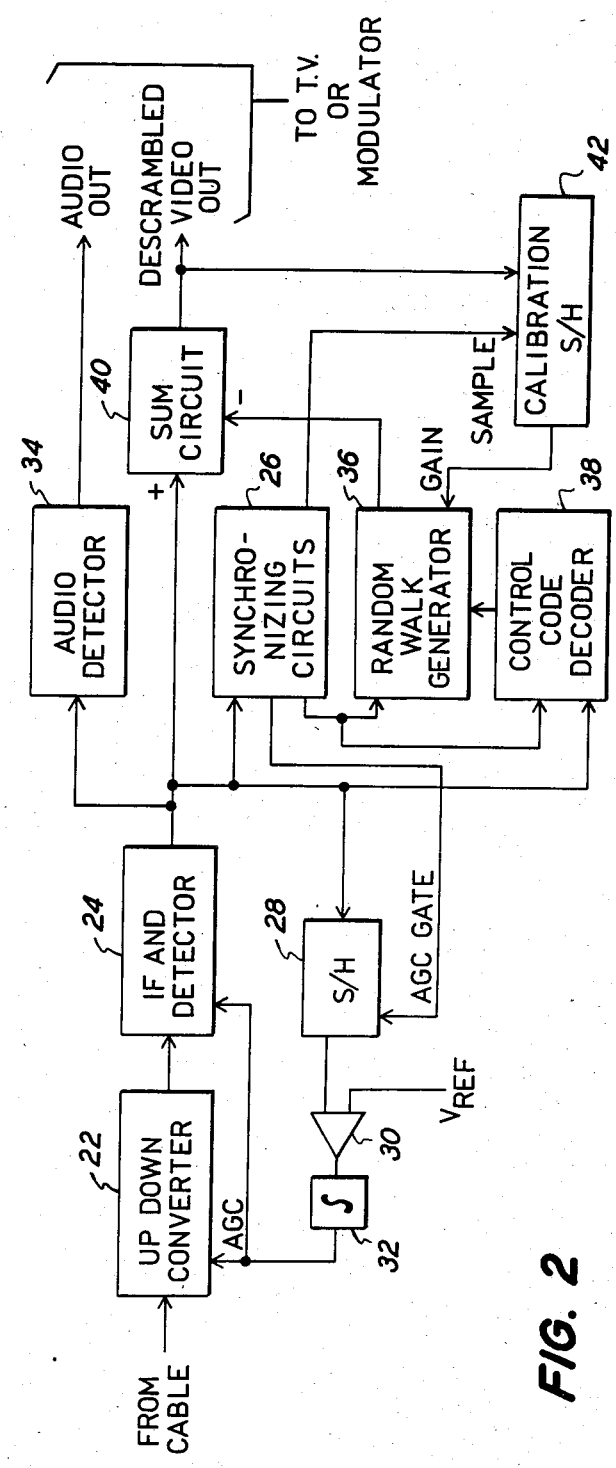
FIG. 2 is a block diagram illustrating the descrambler portion of a scrambling and descrambling system provided in accordance with the invention.
Figure 5A:
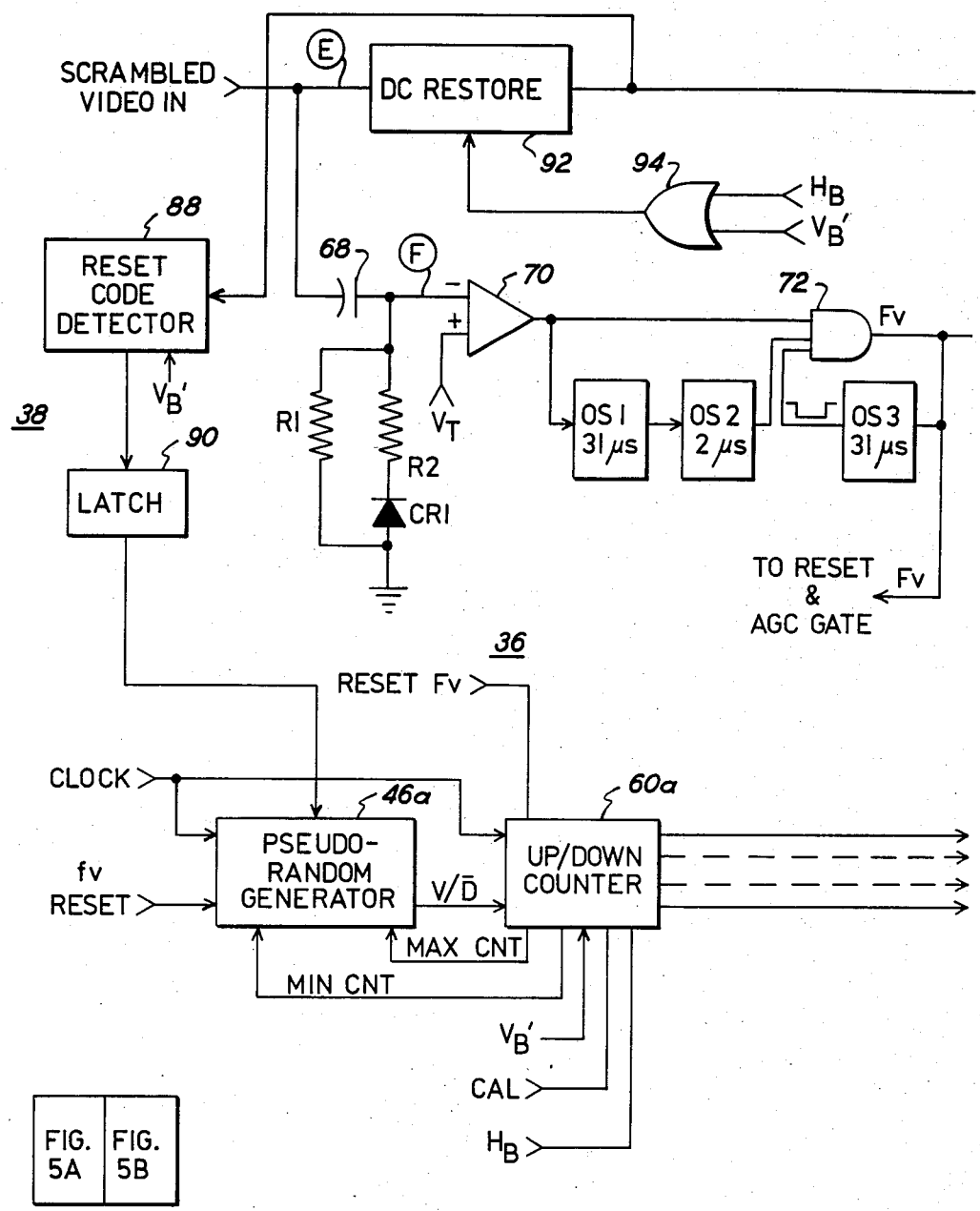
Figure 5B:
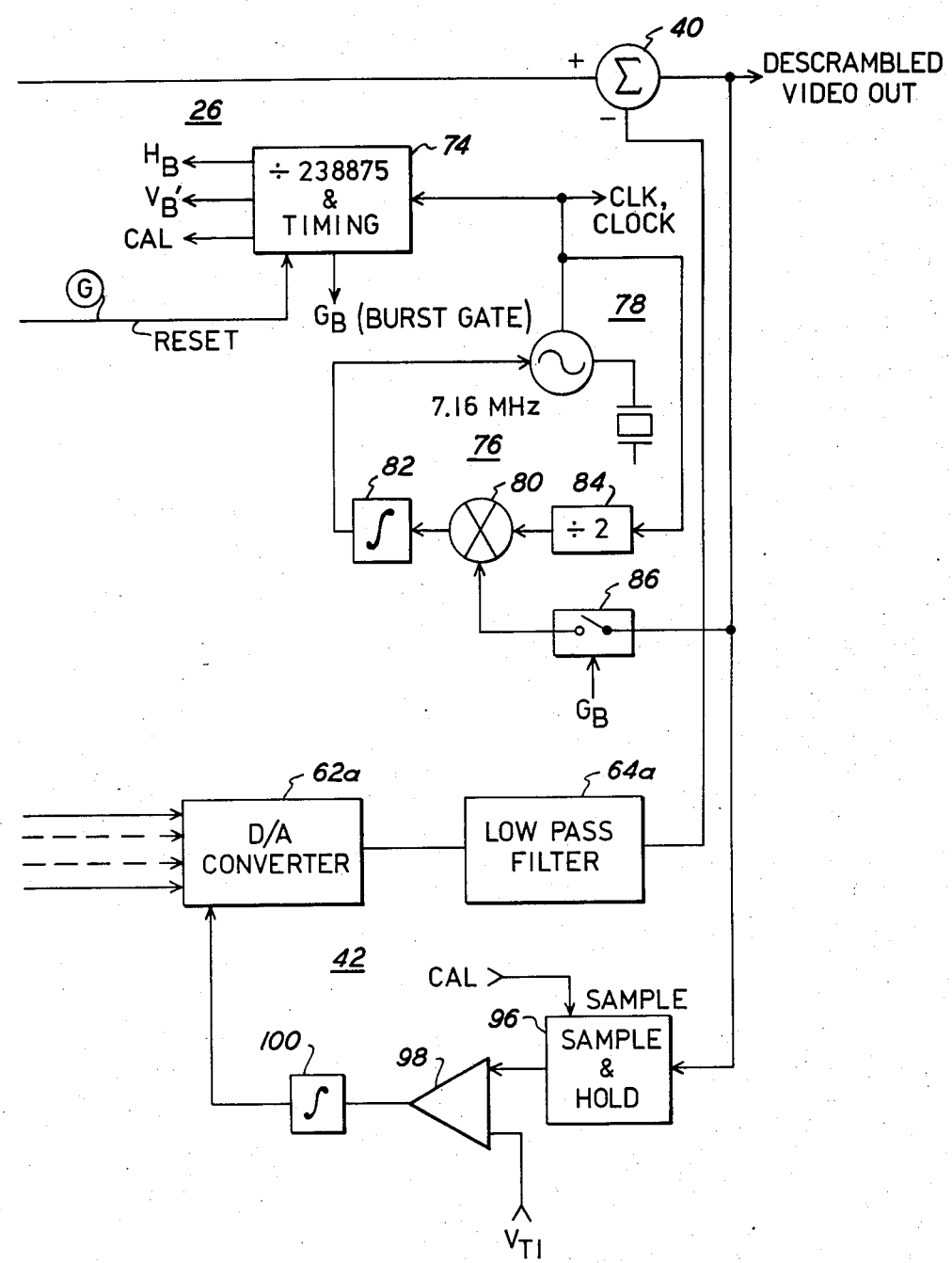
Figure 6:
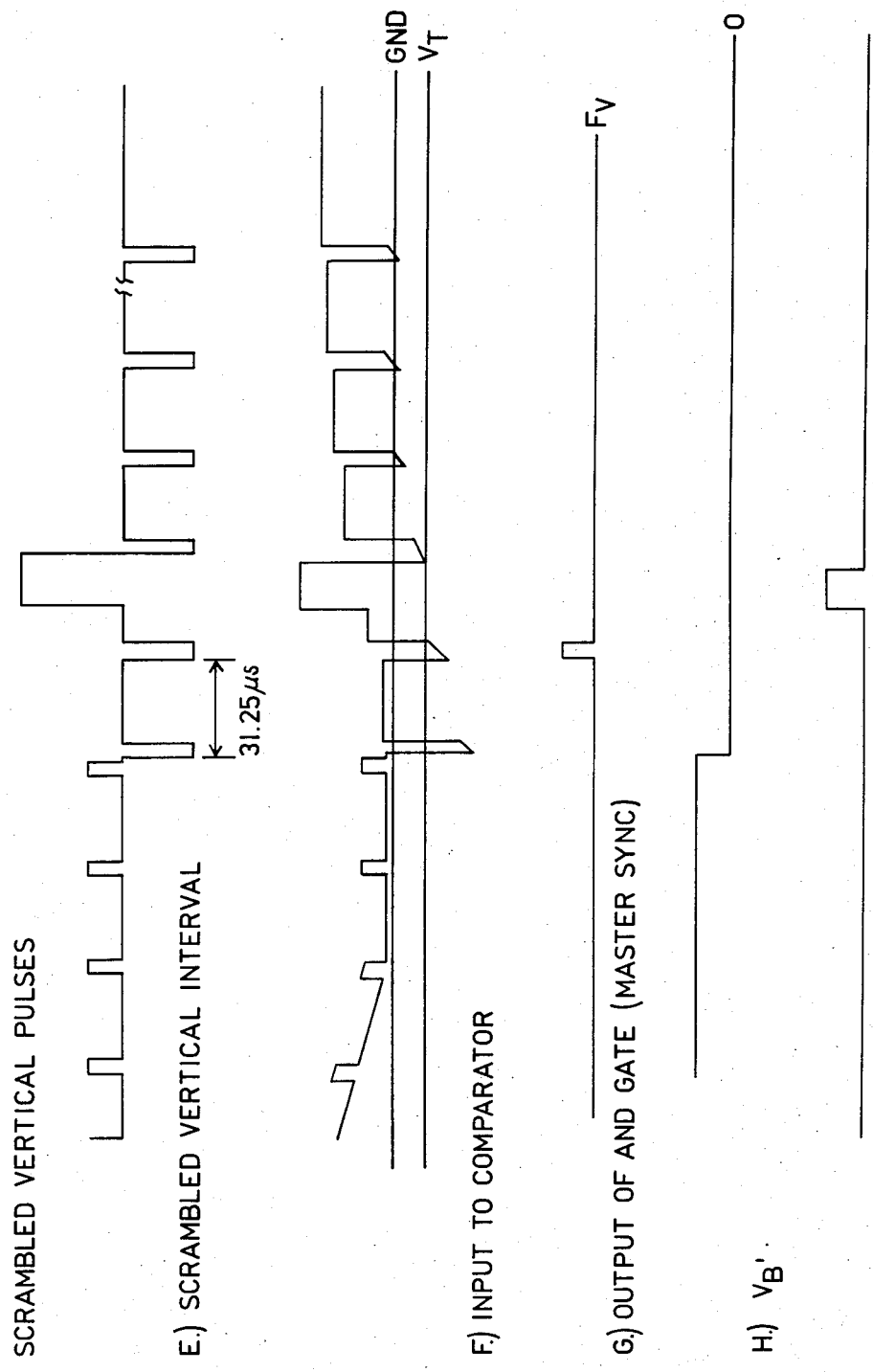
Figure 7A:
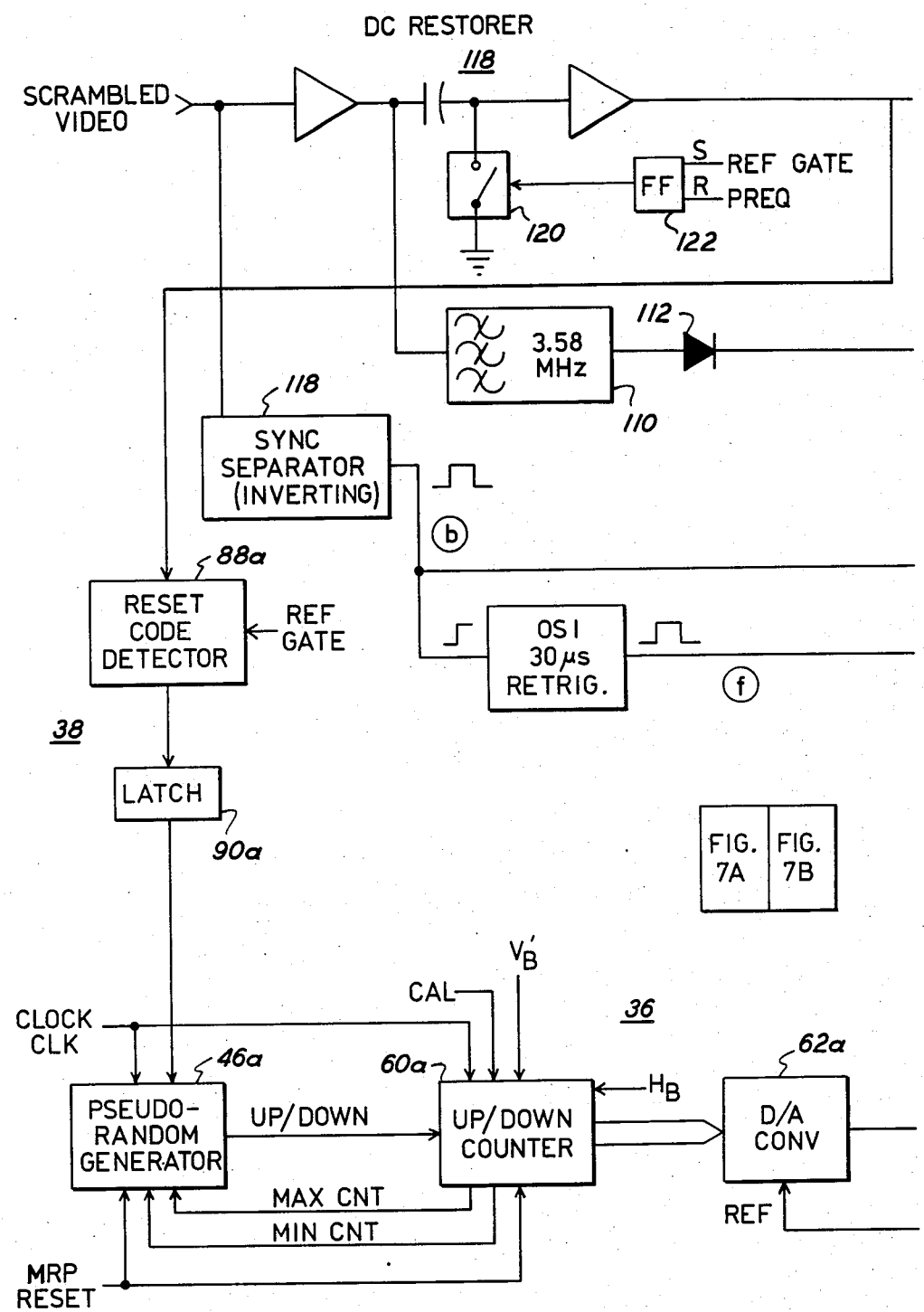
Figure 7B:
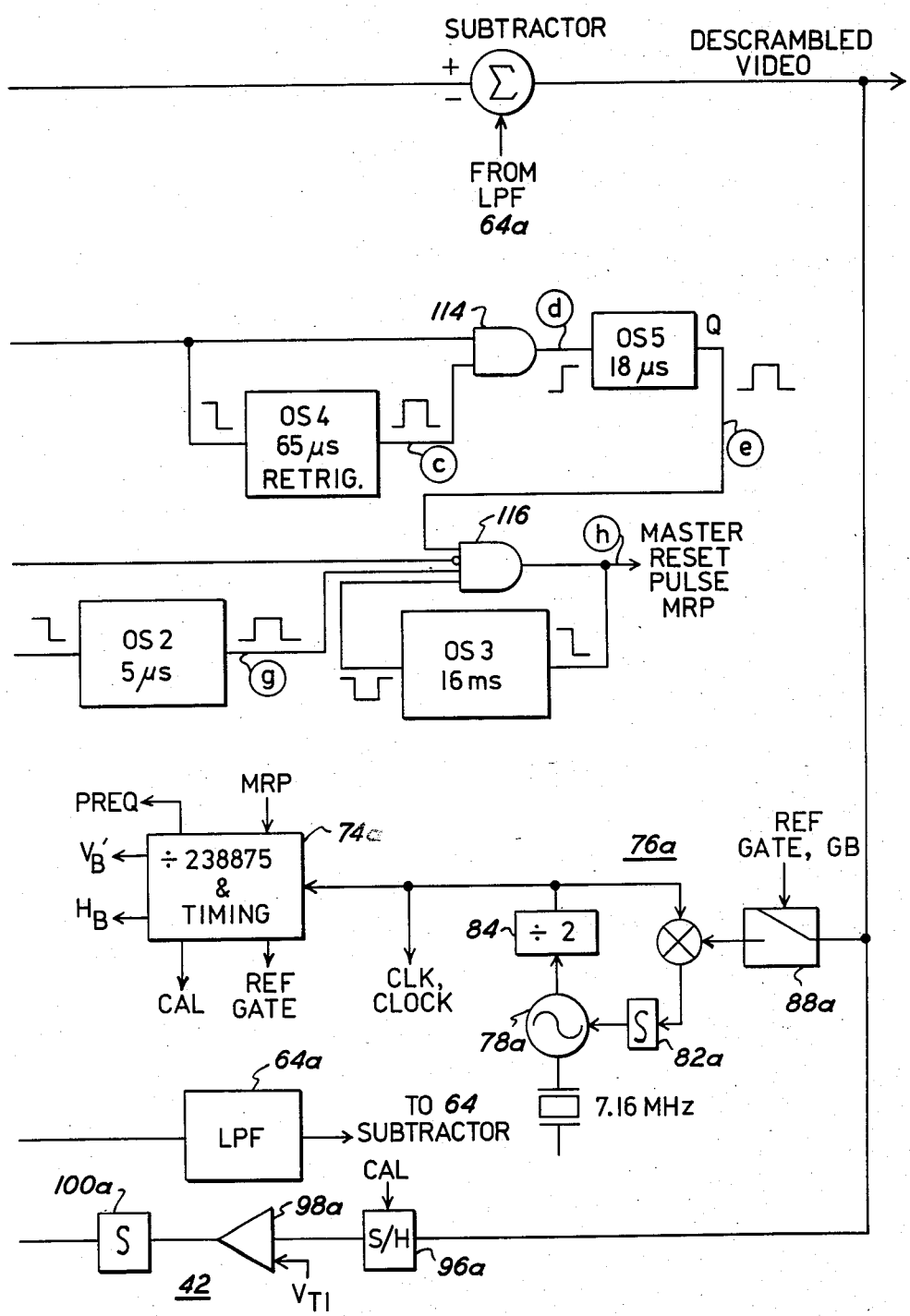
Figure 8:
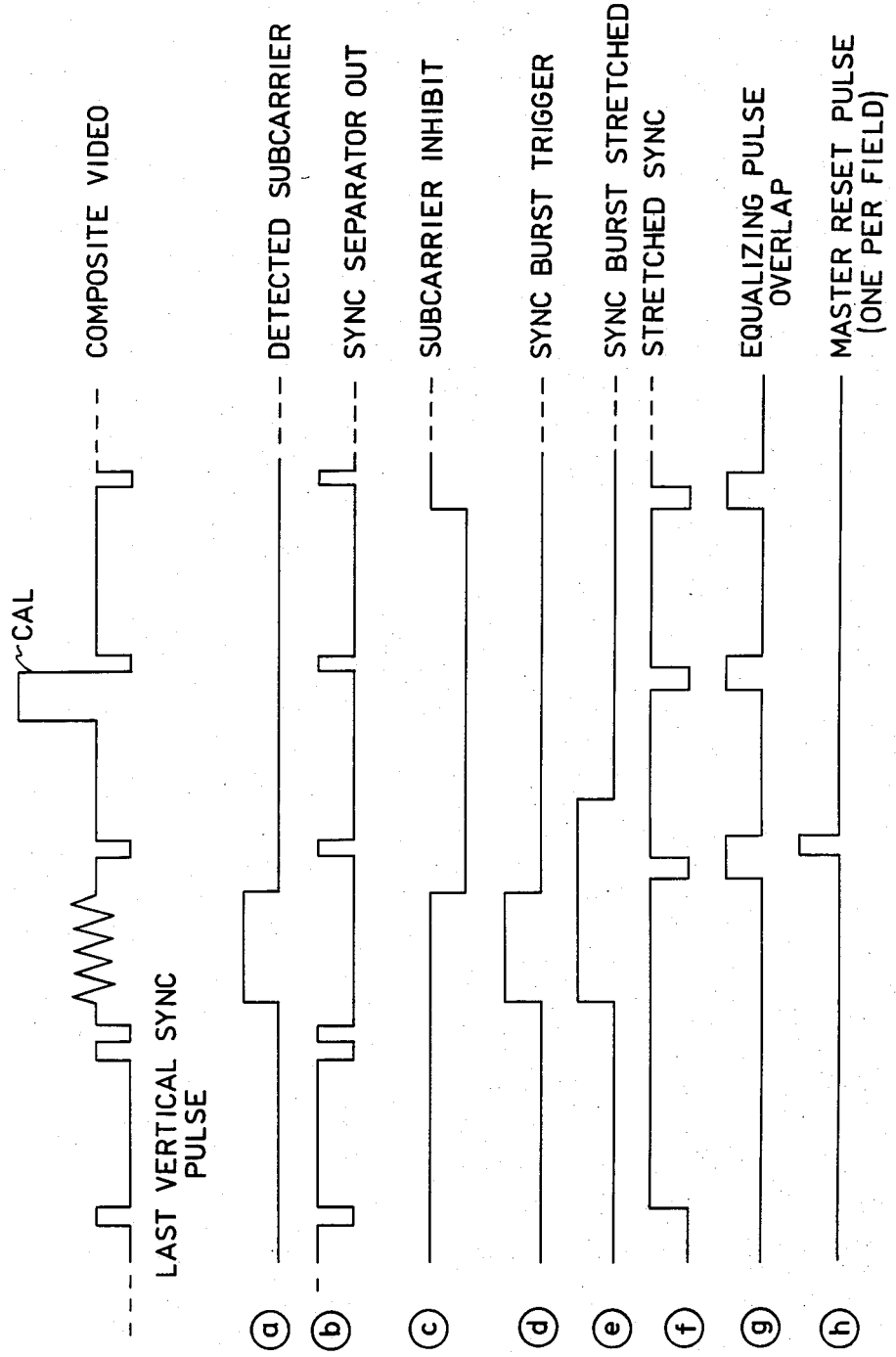

FIGS. 5a & b is a more detailed block diagram showing portions of the descrambler shown in FIG. 2 when provided in accordance with an embodiment of the invention;

FIG. 6 shows waveforms which are explanatory of operation of the descrambler shown in FIG. 5;

FIGS. 7a & b is a more detailed block diagram showing portions of the descrambler illustrated in FIG. 2 which is provided in accordance with another embodiment of the invention; and FIG. 8 shows waveforms illustrating the operation of the descrambler shown in FIG. 7.

Figure 1:
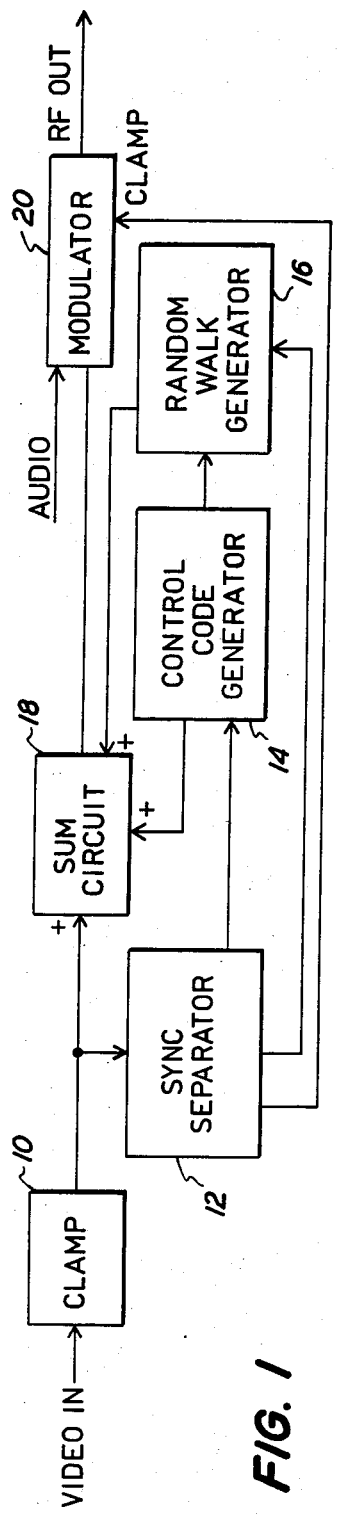
FIG. 1 is a block diagram which illustrates the scrambler portion of a scrambling and descrambling system which is provided in accordance with the invention.

Referring first to FIG. 1, the inputs to the scrambler are the video television signal at baseband and the accompanying FM audio. The video is clamped to maintain its level by a clamp circuit 10, internally keyed by the sync pulses. The video signal may be clamped with the sync pulses negative and the picture levels positive as shown in waveform A of FIG. 3A and in waveform A of FIG. 3B. The picture portion of the video signals are shown as a staircase wave in FIG. 3A for convenience of illustration. A sync separator 12 responds to the horizontal sync pulses and to the sync and equalizing pulses in the vertical interval to provide timing signals to a control code generator 14 and a pseudorandom signal generator 16 which generates the random walk scrambling signal. The waveform of this signal is illustrated in waveform B of FIG. 3A. It is shown with 16 increments of equal duration during each horizontal line interval (between the leading edges of the horizontal sync pulses). In a preferred embodiment there may be several hundred increments during each line interval. In the embodiment of the scrambler shown in FIG. 4 there are 455 such increments per line interval. The pseudorandom pattern is repetitive during each frame. The format of this pattern is determined by the control code generator 14 which outputs a control code and applies it to the pseudorandom scrambling signal generator 16.

Figure 3A:
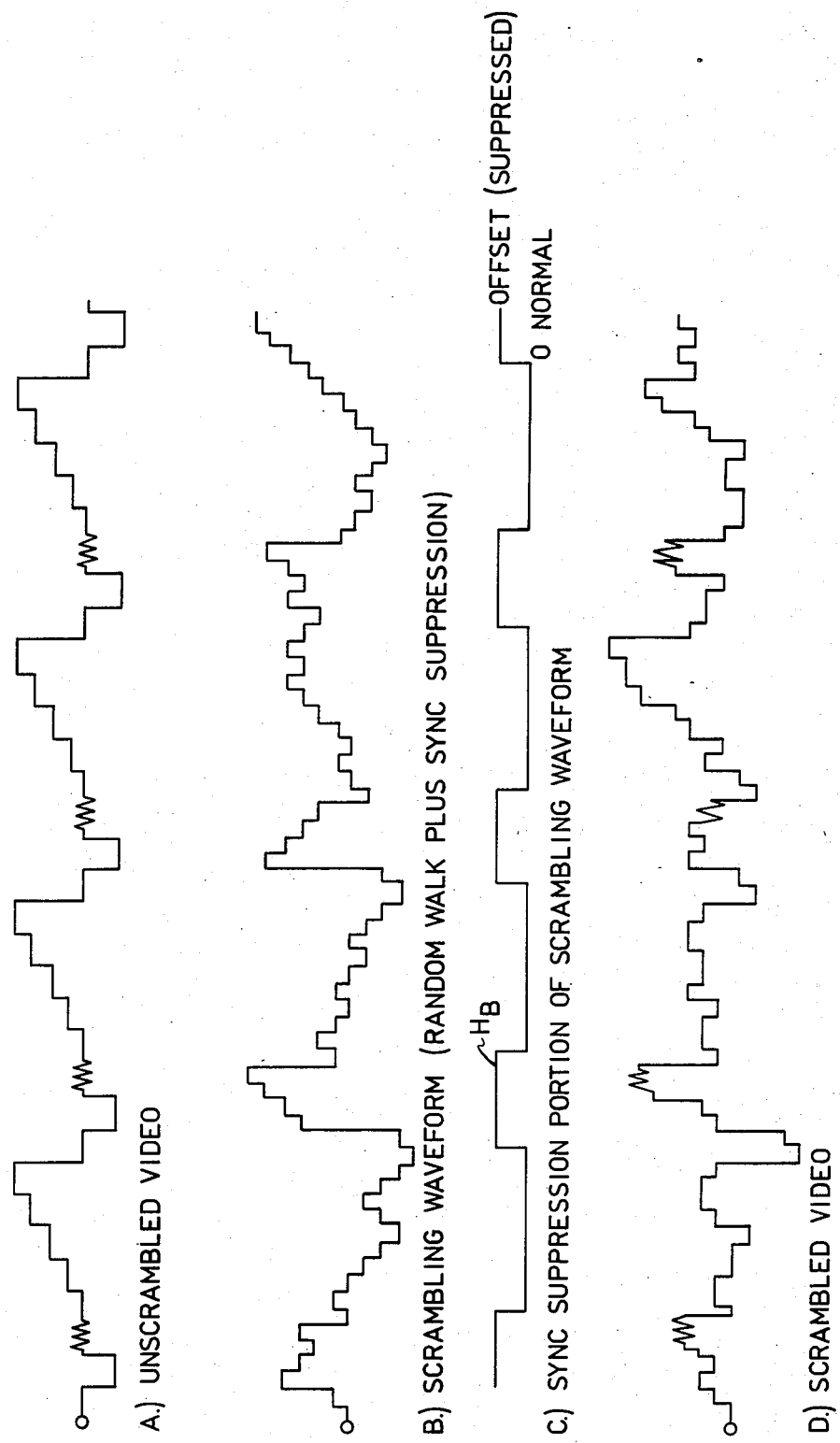
FIG. 3A shows waveforms which are explanatory of the operation of the scrambler provided by the invention, the waveforms depicting an interval of approximately 4 successive horizontal lines of a frame of the TV signal.

It is desirable, in order to enhance the scrambling effect and improve signal-to-noise ratio, to suppress the horizontal and vertical sync pulses. To this end the timing signals from the sync suppressor establish a base line level of the scrambling waveform during the horizontal interval and during the portion of the vertical interval which includes the pre-equalizing pulses and the vertical sync pulses which serves to suppress these pulses to picture level. The sync suppression portion of the scrambling waveform which provides this off-set or suppression level during the horizontal intervals is shown in FIG. 3A waveform C. The sync suppression portion of the scrambling signal in the vertical interval is illustrated in waveform B of FIG. 3B. During each line the increments of the scrambling signal change in level in a random direction, either increasing or decreasing in amplitude. This constitutes a random walk which is difficult to duplicate without having the identical circuit to the random walk generator 16. The scrambling signal is impossible to duplicate without knowledge of the control code. The control code can be changed from time to time. Complimentary codes can be used in successive frames so as to invert the scrambling signal in successive frames, thereby further enhancing the scrambling effect.

The video TV signal, the random walk signal from the pseudorandom generator 16 and the control code are combined by adding them together in a sum circuit 18. The control code may be transmitted as part of the video TV signal, for example superimposed on the post-equalizing pulses as shown in waveform A of FIG. 3B. Alternatively the control codes may be transmitted on an unused cable channel or an unused broadcast frequency. The control codes can also be transmitted by way of telephone lines to the subscribers for the premium programming. Such subscribers can also receive memory IC chips (ROM'S) from which the control codes can be read out. The scrambled video TV signal and the audio are modulated from baseband to the selected channel frequency in an up-convertor modulator 20 which produces the radio frequency (RF) output. It is desirable to clamp the output signal in the modulator to preserve the amplitude relationships in the output signal. The equalizing pulses in the vertical interval may be used to provide a reference level equal to the level at the tips of these pulses.

In order to enable any variation in levels during transmission to be accommodated and compensated for, a calibration pulse is added to the scrambled TV signal. The line interval during which the calibration pulse is transmitted is preferably not scrambled and is normally at blanking level. Suitably the interval between post-equalizing pulses in the vertical interval may be used to carry the calibration pulse. The second line of the post-equalizing portion may be used as illustrated in waveform A of FIG. 3B.

Referring to FIG. 2 there is shown a typical receiving station which is equipped to descramble the scrambled premium TV signal. The RF signal is, in this example, transmitted by way of a cable connected to the up down converter 22

A pseudorandom generator 36, which provides a random walk descrambling system matching the random walk scrambling system produced by the pseudorandom generator 16 in the scrambler, is synchronized by timing signals. produced by the synchronizing circuits 26. The pseudorandom pattern is entered into the random walk generator 36 by detecting the control code transmitted with the TV signal in a control code decoder 38. The control code decoder may receive its inputs, alternatively from signals transmitted via an unused cable channel or via a telephone line. The control codes may prescribe different pseudorandom patterns so as to authorize reception of different programs, thereby providing for multi-tier authorization where subscribers who do not subscribe for certain programs need not be authorized to receive them merely by not transmitting to them the control code during the time that such programs are distributed over the cable.

The random walk descrambling signal from the generator 36 is combined with the scrambled video signal in a sum circuit 40 in which the random walk descrambling signal is subtracted from the scrambled video signal to restore that signal. The level of the output of the pseudorandom generator 36 is also established during the horizontal intervals and the portion of the vertical interval where the vertical sync and pre-equalizing pulses are suppressed to be at a level which will restore these signals to proper level. The timing pulses from the synchronizing circuits 26 also operate the generator 36 to produce a level which is matched to the amplitude of the calibrating pulse during the duration of that pulse. Then, when the descrambling signal from the generator 36 is applied to the sum circuit 40, the calibrating pulse will be suppressed to blanking level, and the other pulses in the vertical interval are restored together with the horizontal pulses and the picture signal. This may be more apparent from waveform C of FIG. 3B which shows the sync suppressed vertical interval. All of the pulses except for the post-equalizing pulses are suppressed. The random walk pattern is not shown in waveform C so as to reveal the presence of the synchronizing signals during that interval. Since the restoring signal from the generator 36 is matched to remove not only the random walk pattern but the level which is suppressing the sync pulses, they are restored when the signal from the random walk generator 36 is subtracted in the sum ciruit 40.

Normalization of the amplitude of the restoring signal involves the calibrating signal. The amplitude of the calibrating pulse is set at the maximum level of the scrambling signal which is inserted at the calibrating pulse time by the generator 16 in the scrambler. When the calibrating pulse is subtracted in the sum circuit 40 from the scrambled signal, the resulting level should be at blanking level. The descrambled output is sampled in a calibration sample and hold circuit 42 at the time of the calibrating pulse, by applying a sampling pulse at that time to the sample and hold 42 from the synchronzing circuits 28. A comparison in the calibrating circuits with blanking level results in a gain control signal for the pseudorandom generator 36 which normalizes the amplitude of the descrambling signal and ensures that an amplitude match is maintained.

Figure 4:
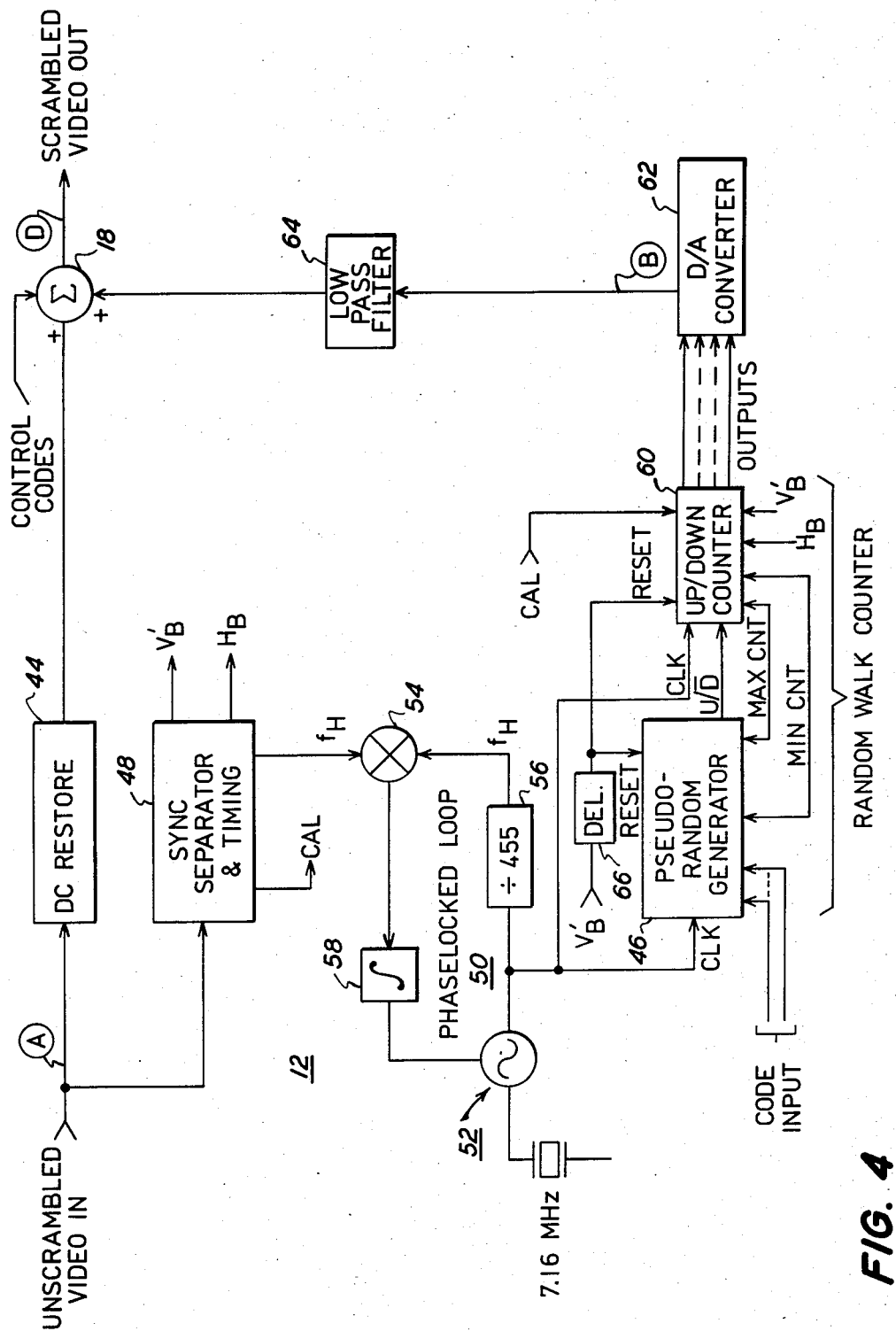
FIG. 4 is a more detailed block diagram showing portions of the scrambler illustrated in FIG. 1.

Referring to FIG. 4 the scrambler shown in FIG. 1, implements in accordance with a presently preferred embodiment of the invention is shown. The unscrambled video (see, waveform A of FIG. 3A) is applied to a direct current restoring circuit 44, such as a conventional keyed clamp circuit. The clamped unscrambled video TV signal then is applied to the sum circuit 18 which is illustrated by the circle containing the sigma symbol. The control codes are also added as a serial code signal during the line interval between post-equalizing pulses. This control code corresponds to a bit parallel code input to a pseudorandom generator 46 which is one component of the pseudorandom signal generator 16. This generator provides the scrambling signal to the sum circuit 18 so as to provide the scrambled, suppressed sync video televison signal output. This output is shown by way of example in waveform D of FIG. 3A and goes to the upconverting modulator 20 (FIG. 1).

Figure 3B:
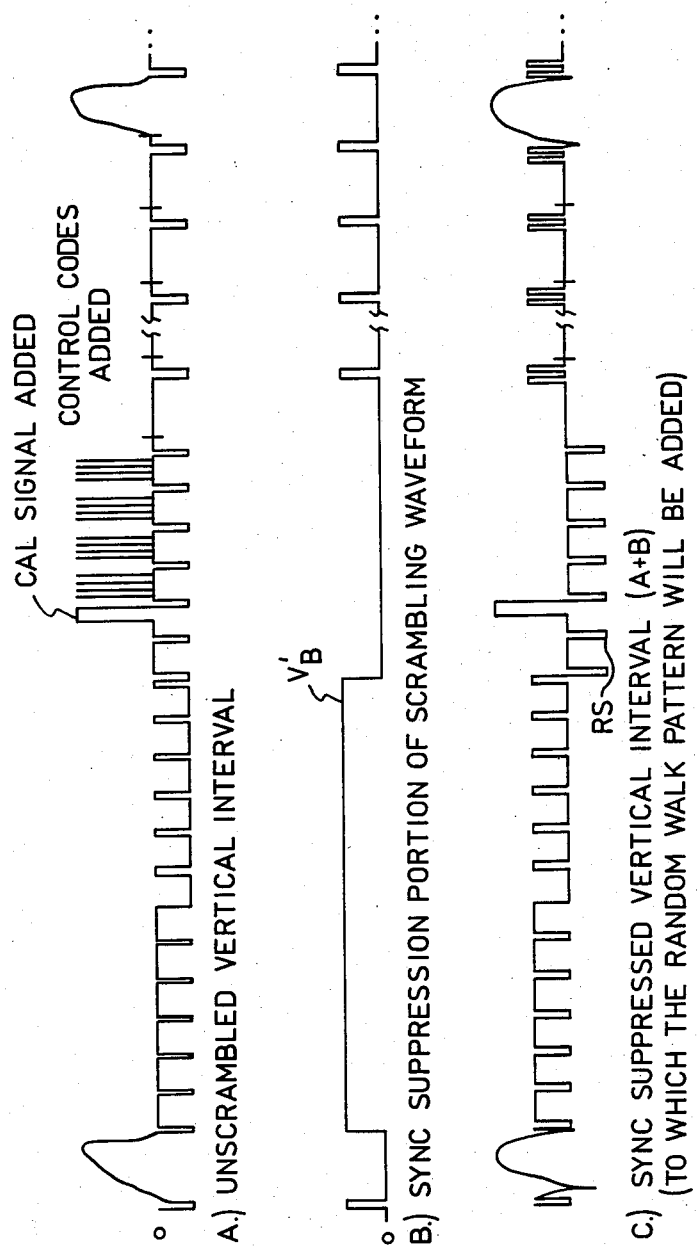
FIG. 3B are waveforms illustrating the vertical interval of the TV signal which are useful in explaining the operation of the scrambler which is provided in accordance with the invention.

A sync separator and timing pulse generator 48 outputs a horizontal blanking pulse ($H_B$) and a modified vertical blanking pulse ($V_B'$) these pulses are shown in waveform C of FIG. 3A and in waveform B of FIG. 3B. The horizontal blanking pulse duration is equal to that of the horizontal interval. The modified vertical blanking pulse occurs from the beginning of the vertical intervals to the end of the vertical sync pulses, not through the post-equalizing and retrace periods. The calibrating pulses also produced occur during the second line of the post-equalizing period as shown in waveform A of FIG. 3B. A pulse $f_H$ timed to the horizontal sync pulse and generated in the sync separator and timing circuits 48 is used to synchronize the scrambling signal which is produced in the pseudorandom signal generator 16. The sync separator and timing circuits 48 may be implemented by counters and gating logic clocked by the output of a conventional sync separator circuit.

A phase locked loop 50 completes the sync separator circuits 12 which produce the clock signal for the pseudorandom scrambling signal generator 16. A variable frequency crystal controlled oscillator 52 produces the clock signal at 455 times the line frequency. The loop 50 locks the oscillator to the horizontal sync pulses of the video TV signal. This loop is conventional and includes a phase detector 54 which compares the phase of the signal produced by the oscillator 52 divided by 455 in a divider 56 with the $f_H$ pulses from the circuits 48. The phase detector output is a level which is integrated as by low pass filtering in an integrator circuit 58 to provide an error voltage which controls the frequency and phase of the oscillator 52.

The pseudorandom scrambling signal generator 16 has as its major components a pseudorandom generator 46, and up-down counter 60, a digital to analog converter 62 and a low pass filter 64. The pseudorandom generator 46 and the up-down coutner 60 are clocked by the clock signal (CLK) from the loop 50 of the sync separator 12 to produce the multi-increment random walk pattern with sync suppression; the pattern being specified by the code input to the pseudorandom generator 46. The pseudorandom generator 46 may be a counter, the stages of which are interconnected in accordance with the code input to provide successive outputs, at the times of each clock, which is either of high or low level and provides an up or down count command (U/D) to the up-down counter 60. The counter 60 then counts up or down during each successive clock period to produce a multibit digital output having a value which increases or decreases corresponding to the count in the counter 60. The incremental change in value of the digital signal is fixed and may be in the lowest order bit of the digital output. The digital to analog convertor 62 translates the digital output signal into an analog signal which has the random walk pattern consisting of a multiplicity of increments during each line interval.

The low pass filter 64 has a cutoff frequency above the clock rate and serves to standardize the transition time between the increments of the random walk scrambling signal. This reduces the slew time of the transitions between the increments and facilitates matching with a corresponding signal generated in the random walk generator 36 of the descrambler (see FIG. 2). The pseudorandom generator 46 and the up-down counter 60 may be implemented in other ways, for example by programming of a microprocessor chip.

In order to suppress the horizontal intervals and the portion of the vertical interval up to the post-equalizing pulsing and in order to impress the calibrating pulse on the scrambling signal, the $H_B$, $V_B'$ and CAL pulses are applied to the up-down counter 60 to present the counter 60 to a base count corresponding to the suppression level, in the case of the $H_B$ and $V_B'$ pulses, and to force the counter to the maximum count in the case of the calibrating pulse. Because the counter 60 cannot be allowed to change more than one state in each clock period, feedback paths are provided between the counter 60 and the generator 46 to force the generator 46 to permit the counter 60 to move away from a maximum or minimum count.

The pseudorandom generator 46 and the up-down counter 60 are reset each frame, at the time of the second post-equalizing pulse. This pulse is at RS in waveform C of FIG. 3B. The pulse is derived from the trailing edge of the $V_B'$ signal which is delayed by the line interval between the post-equalizing pulses in a delay circuit 66. This circuit may be implemented by techniques known in the art, such as one shots, counters or in the program, if a microprocessor chip is used.

It will be noted from waveform C of FIG. 3B that the sync suppression portion of the scrambling waveform is wider than the duration of the horizontal sync pulses, thus the suppressed horizontal interval is distorted into a pair of pulses which are suppressed into the picture level portion of the TV signal thereby even further distorting the horizontal sync information.

In referring to FIG. 5 there is shown an embodiment of the descrambler which operates at base band on the scrambled video TV signal from the IF and detector signals 24 (FIG. 2). The synchronizig circuits 26 respond to the post-equalizing pulses of the scrambled video which are at "non-scrambled" level as shown in FIG. 3B, waveform C. Waveform E in FIG. 6 shows these pulses on an enlarged scale. The sync separator 26 has a circuit at its input including a capacitor 68 which AC couples the scrambled video to the input of a comparator 70 for comparison with a threshold voltage ($V_T$) having a level between blanking level, illustrated as ground, and the tips of the equalizing pulses (see waveform F of FIG. 6). Connected between the input to the comparator 70 and ground is a circuit consisting of a resistor R2 and a diode CR1 which is polarized to conduct in the presence of the negative going post-equalizing pulses. R2 and CR1 are shunted by a resistor R1. By the time the post-equalizing pulses arrive, the base line level of the scrambled video has reached almost the ground or blanking level as shown in waveform F of FIG. 6. Then, with the first post-equalizing pulse, the diode CR1 conducts. The capacitor 68 begins charging through R2. The time constant of the circuit consisting of R1, R2 and the capacitor 68 is such that after at least two consecutive pulse equalizing pulses the level at the input of the comparator 70 rises above the threshold $V_T$. Additional post-equalizing pulses then do not produce outputs from the comparator. The post-equalizing pulses which are outputted by the comparator 70 are applied to an input of an AND gate 72. These pulses are also applied to a one shot. OS1 which fires at the leading edge of the first output pulse from the comparator and triggers a second one shot, OS2, on the trailing of the output pulse from OS1. Because of the time delays chosen, the output pulse from OS2 is coincident with the expected time of arrival of the second pulse from the comparator 70, which corresponds to the second post-equalizing pulse. The AND gate 72 is the enabled and provides a reset or synchronizing pulse $F_V$ (see waveform G of FIG. 6). $F_V$ is the master sync pulse. It is used to reset the random walk generator 36 in the descrambler each frame time such that the descrambling signal and the scrambling signal are synchronzied, both signals being synchronous with the TV signal. The $F_V$ pulse also triggers another one shot OS3 which inhibits the AND gate 72 for a time just short of the time when the next second post-equalizing interval is expected (one field time) in order to provide noise immunity in the sychronizing circuits 26. It will be noted that the reset pulses for the random walk generators 16 and 36 in the scrambler and descrambler, respectively, occur at the same time, on occurence of the second post-equalizing pulse.

The master reset pulse $F_V$ is applied to the sample and hold circuit 28 (FIG. 2) as the AGC gate since this pulse occurs at a time when the expected amplitude of the incoming scrambled video signal is known, thereby permitting correct automatic control of gain. $F_V$ is also a reference for the clock for the random walk generator 36. A divide by 238875 counter and timing circuits 74 generates the horizontal blanking pulse $H_B$, the modified vertical blanking pulse $V_B'$ and the calibrating pulse CAL. These circuits 74 also generate a burst gate $G_B$, which is a pulse timed to occur at the time of the color burst. This burst is precisely at 3.58 MHz and is used to phase lock a burst loop 76. This loop includes a 7.16 MHz variable frequency oscillator 78, a phase detector 80, a low pass filter integrator 82, a divider 84 and a switch, such as an electronic switching circuit 86 which is enabled during the period of the burst gate pulse. The oscillator 78 is then phase locked to the color burst and synchronous with the master reset pulse, since the divider and timing circuit 74 are reset by the master reset pulse $F_V$.

The modified vertical blanking pulse $V_B'$ and the calibrating pulse CAL are shown in waveforms H and J of FIG. 6. These waveforms are aligned with waveforms E, F and G to show the timing of the $V_B'$ and CAL pulses.

The random walk generator 36 is preferably identical to the random walk generator which is used in the srambler and like parts are identified by like reference numerals with the subscript "a" added. The control code is inputted to the pseudorandom generator $46_a$ after detection by a reset code detector 88 in the control code decoder 38. The decoder is enabled by $V_B'$. The output code signals are latched in a latch circuit 90 which inputs them to the pseudorandom generator $46_a$. The codes may of course change during each vertical interval. The codes are transmitted with the scrambled signal and the signal is restored by DC restore or clamp circuit 92 which is keyed by $H_V$ and $V_B'$ through an OR gate 94. The descrambled signal is outputted from the sum circuit 40 to which the descrambling signal from the random walk generator is applied in a subtractive sense.

The amplitude of the descrambling signal is normalized through the use of the calibration sample and hold cirucits 42. This circuit includes a sample and hold circuit 96 which samples the descrambled video output at the time of the calibrating pulse. A comparator circuit 98 compares the level at the output of the sample and hold circuit 96 (which should be at blanking level) to the amplitude of a threshold voltage $V_{T1}$ which is at blanking level. The output of the comparator 98 is integrated by a low pass filter integrator 100 and applied as a reference to the digital to analog convertor $62_a$ of the random walk generator 36. Therefore, a feedback loop is formed to adjust the gain of the digital to analog converter such that the output therefrom will exactly match the level of the transmitted scrambling signal component of the video TV signal. The operation of the random walk generator 36 in assuring that the suppressed sync components and the calibrating pulse component from matching corresponding components in the scrambling system are generated in the descrambling system, is obtained by applying the $V_B'$, CAL and $H_B$ pulses to the up-down counter $60_a$, as was explained in connection with the operation of the counter 60 in FIG. 4.

Consider now FIGS. 7 and 8 which show and describe the operation of a descrambler in accordance with a further embodiment of the invention. This descrambler differs from the descrambler shown in FIG. 5, principally in the synchronizing circuits 26 thereof.

The signal transmitted by the scrambler is modified in the scrambler by adding the color subcarrier (3.58 MHz) on the suppressed blanking level during the first three-quarters (approximately) of the first half line of the post-equalizing interval as shown in the top unnumbered waveform in FIG. 8. The synchronizing circuits 26 detect this color burst in that it occurs between negative going pulses in the post-equalizing interval spaced about 31.25 microseconds (one-half of the horizontal line interval) apart. This is a unique condition because in a standard NTSC signal, the color burst is never included within an equalizing interval. This burst is detected at the output of a 3.58 MHz band pass filter 110 in the synchronizing circuits 26. A diode 112 provides a logic level coincident with the burst interval as shown in waveform a of FIG. 8. This logic level triggers a one shot OS4 which outputs a low logic level pulse for a period of time (65 microseconds) after the trailing edge of the color present pulse corresponding to the detected color subcarrier burst (see waveform c of FIG. 8). The one shot OS4 has a period exceeding that of one horizontal line and prevents false triggering during the active (picture) portions of the video TV signal. An AND gate 114 develops a sync burst trigger shown in waveform d of FIG. 8 from the subcarrier inhibit and detected subcarrier burst pulses. This trigger pulse is stretched by a one shot, OS5, so as to insure that the sync burst trigger overlaps the equalizing pulse following the color burst. The stretched color burst provides an input for enabing and AND gate 116 which produces the reset pulse (MRP). This pulse has the same timing as the $F_V$ pulse which was described in connection with FIGS. 5 and 6. The AND gate 116 also receives input pulses establishing the time of the $F_V$ pulse through the use of a sync separator circuit 118. This circuit consists of the comparator 70, the capacitor 68 and the discharge circuits including R1, R2 and CR1 which were described in connection with FIG. 5. The pulses coincident with the post-equalizing pulses which are detected by the sync separator 118 are inverted before application to the input of the AND gate 116, since a positive logic responsive AND gate 116 is shown by way of illustration.

It will be observed that there are three enabling signals applied to the AND gate 116, namely the stretched sync burst which is high from the beginning of the sync burst through the following equalizing pulse, the first two equalizing pulses from the sync separator 118 (inverted), and the pulse from the one shot OS2 which, because of the time out period (5 microseconds) of that one shot overlaps the second equalizing pulse. The timing of these pulses will be apparent from FIG. 8. It will also be apparent from FIG. 8 that the master reset pulse is produced coincidentally with the second post-equalizing pulse. The one shot OS3 inhibits the AND gate 116 until the time of the vertical interval for the next field.

A burst loop and a divider and counter provide the $V_B'$, $H_B$ CAL and reference gate, $G_B$, pulses. The circuits which clock the divider and timing circuits as well as the color burst loop are similar to the circuits described in connection with FIG. 5 and are identified by like reference numeral with the postscript a annexed. Another pulse, PREQ, which is coincident with the post-equalizing pulse which precedes the post-equalizing pulse which is coincident with the master reset pulse (MRP). These pulses are used in a DC restorer 118 made up of two amplifiers interconnected by a capacitor which is switched to ground (blanking level) by an electronic switch 120. A flip/flop 122 is set by the reference gate $G_B$ which occurs at the beginning of the color sync pulse and reset by the PREQ pulse thereby assuring removal of the color burst between the successive post-equalizing pulses.

The random walk generator 36 and its control code decoder 38 operate in the same way as was described in connection with FIG. 5 to produce the descrambling signal. Like parts in FIG. 7 to those described in connection with FIG. 5 are labeled by like reference numerals. Similarly, the digital to analog converter $62_a$ is gain controlled for control of the amplitude of the descrambling signal by the circuits 42 which are alike in their structure and operation to circuits described in connection with FIG. 5 and identified by like reference numerals. Accordingly, the descrambler shown in FIG. 7 is operative to provide a descrambled TV video signal for reception by authorized subscribers.

From the foregoing description it will be apparent that there has been provided improved scrambling and descrambling systems for subscription television. While various embodiments of the systems have been described, it will be appreciated that variations and modifications, within the scope of the invention, will undoubtedly suggest themselves to those skilled in the art. Accordingly, the foregoing description should be taken as illustrative and not in a limiting sense.

I claim:

1. A system for scrambling and descrambling TV signals which comprises means for generating a first signal in synchronous relationshp with the TV signals which varies pseudorandomly in amplitude, means for combining said first signal with said TV signal to provide a scrambled TV signal for transmission, means for generating a second signal having the same pseudorandom amplitude variation and synchronous relationship with said TV signal as said first signal, and means for combining said second signal with said scrambled TV signal to descramble said TV signal for reception.

2. The system according to claim 1 wherein said generating means includes means for controlling the amplitude of said first signal such that synchronizing pulses are retained in at least a portion of the vertical blanking interval of said scrambled TV signal, and said second signal generating means includes means responsive to said synchronizing pulses for generating said second signal in synchronous relationship with said first signal such that the pseudorandom amplitude variations in said scrambled TV signal and in said second signal are in matching relationship in said combining means therefor.

3. The system according to claim 2 wherein said means for combining said first signal and said TV signal and said means for combining said second signal with said scrambled TV signal operate in opposite senses, one additively and the other subtractively.

4. The system according to claim 1 further comprising control code signal generating means for generating a control code signal which defines the pseudorandom amplitude variation in said first signal, means including in said first signal generating means responsive to said control code signal for conditioning said first signal generating means to produce said pseudorandom amplitude variation of said first signal in accordance therewith, and means included in said second signal generating means also responsive to a control signal corresponding to said control code signal for conditioning said second signal generating means to produce said same pseudorandom amplitude variation of said second signal in accordance therewith.

5. The system according to claim 4 further comprising means for transmitting said control code signal as part of said scrambled TV signal, and means responsive to said scrambled TV signal for detecting said control code signal to provide a signal for operating said means for conditioning said second signal generating means.

6. The system according to claim 1 wherein said first and second signal generating means each comprises means for generating said signal in a multiplicity of incremental steps, each of said steps having a duration much less than the line interval of said TV signal.

7. The system according to claim 6 wherein said first and second signal generating means each further comprises means for varying the amplitude of said first and second signals during each of said steps by an amplitude which is much less than the difference between black and white levels of said TV signal.

8. The system according to claim 7 wherein said signal generating means further comprises means for filtering said stepwise amplitude varying signal to slow the rate of change in the transitions between the steps thereof.

9. The system according to claim 6 wherein said first and second signal generating means comprises means for generating a clock signal synchronous with said TV signal at a repetition rate much higher than the line rate of said TV signal, means clocked by said clock signal for generating a digital signal which changes pseudorandomly in value upon occurrence of each clock signal, and means for converting said digital signal into an analog signal to provide an output signal which changes pseudorandomly stepwise in amplitude.

10. The system according to claim 9 wherein said first and second signal generating means each further comprises low pass filter means for reducing the rate of change in amplitude of the transitions between the stepwise changes in amplitude of said output signal.

11. The system according to claim 1 further comprising means for inserting calibrating pulses at predetermined times in said scrambled TV signal, means for generating a referencing signal in response to said calibrating pulses, and means for controlling the amplitude of said second signal in response to said referencing signal.

12. The system according to claim 9 further comprising means for inserting calibrating pulses in the vertical interval of said scrambled TV signal, means responsive to said calibrating pulses in said scrambled TV signal for generating a reference level, and means for applying said reference level to said converting means in said second signal generating means to conform said second signal amplitude with the amplitude of said pseudorandom variation in said scrambled TV signal.

13. The system according to claim 9 further comprising means for suppressing horizontal sync and at least the vertical sync pulses of said TV signal into picture level in said scrambled TV signal, and means for restoring said suppressed pulses together with said pseudorandom amplitude variations in said scrambled TV signal in the scrambling of said scrambled TV signal.

14. The system according to claim 9 wherein said digital signal generating means comprises a pseudorandom pulse generator responsive to said clock signal for generating pulses in a pseudorandom sequence, and a counter for counting said pulses for providing a multibit bit the amplitude of which has a random walk variation changing incrementally in value at the time of each of said clock signals.

15. The system according to claim 14 wherein means are provided to maintain said counter at counts such that the value of said digital signal corresponds to amplitude levels of said TV signal during the horizontal interval and at least during the portion of said vertical interval including the vertical sync pulses to suppress and restore said sync pulses with said first signal and said second signal, respectively.

16. The system according to claim 14 further comprising means to reset said generator and said counter at corresponding times during each vertical interval of said TV signal.

17. The system according to claim 16 comprising means for setting said generator in said first and second signal generating means to generate pulses in selected pseudorandom sequences.

18. The system according to claim 16 wherein said reset signal generating means for said generator and counter in said second signal generating means comprises means responsive to said scrambled TV signal for detecting a predetermined pulse of the post-equalizing pulses in the vertical intervals of said scrambled TV signal, and means for generating a reset pulse for resetting said least name generator and counter corresponding to said predetermiend post-equalizing pulse.

19. The system according to claim 18 further comprising means for detecting another pulse in response to a burst of an oscillatory signal between said predetermined pulse and its preceding post equalizing pulse, said reset pulse generating means being responsive to said another pulse.

20. Apparatus for extracint synchronizing signals from a suppressed sync scrambled television signal wherein all but a plurality of successive pulses in the verticl blanking interval of the signal are suppressed to picture signal level which comprises a comparator having a threshold level between the maximum level of said plurality of successive pulses and said picture signal level, signal level responsive means for coupling said suppressed sync signal to the input of said comparator which changes the level of said successive pulses towards picture level such that at least two of said successive pulses exceeds said threshold level and said comparator produces at least two successive pulses in said vertical interval, and means responsive to said two successive pulses for providing a synchronizing signal concurrent with the last occurring one thereof.

21. The apparatus according to claim 20 wherein two successive pulses are post-equalizing pulses in said vertical interval, said television signal having the vertical sync pulses, the equalizing pulses preceding said vertical sync pulses in said vertical interval and said horizontal sync pulses suppressed into picture level.

22. The apparatus according to claim 20 wherein said coupling circuit comprises a capacitor connected to the input of said comparator, a first resistor connected between said comparator input and a point of reference black picture level, a second resistor and a unidirectionally conductive device also connected between said comparator input and said point of reference level and polarized to conduct in response to said successive pulses, and said first and second resistors and capacitor defining a time constant such that the level at said comparator input decreases below said threshold level after at least two of said successive pulses have occurred.

23. Theappartus according to claim 21 wherein said sychronizing signal providing means comprises means for providing an output in response to the simultaneous presence of at least a pair of inputs thereto, means for applying said two successive second pulses to one of said pair of inputs, and delay means responsive to the first of said two successive pulses for providing an output pulse at the expected time of said second of said two successive pulses for applying an enabling pulse to the other of said pair of gate means inputs, whereby said gate means produces said synchronizing signal coincidentally with the second of said two successive pulses.

24. The apparatus according to claim 23 further comprising means operated by said synchronizing signal for inhibiting said gate means for about the interval of one picture field of said television signal after occurrence of said synchronzing signal.

* * * * *